United States Patent
Schoen et al.

(10) Patent No.: US 8,636,162 B2
(45) Date of Patent: Jan. 28, 2014

(54) FUEL TANK SHELL WITH STRUCTURAL SUPPORT

(75) Inventors: Doug Schoen, Plymouth, MI (US); Todd Marentette, Wheatley (CA); Steve Fontaine, Weedon (CA); Cory Borghi, Windsor (CA); Doug Olgren, Grosse Ile, MI (US); Leslie Menec, Bromont (CA); Mark Church, Belle River (CA)

(73) Assignee: Les Industries Spectra/Premium, Inc., Quebec (CA)

( * ) Notice: Subject to any disclaimer, the term of this patent is extended or adjusted under 35 U.S.C. 154(b) by 721 days.

(21) Appl. No.: 12/325,051

(22) Filed: Nov. 28, 2008

(65) Prior Publication Data

US 2009/0189384 A1 Jul. 30, 2009

Related U.S. Application Data

(60) Provisional application No. 61/024,239, filed on Jan. 29, 2008.

(51) Int. Cl.
*B60K 15/03* (2006.01)

(52) U.S. Cl.
USPC ............................ 220/4.14; 220/562; 220/563

(58) Field of Classification Search
USPC .............. 220/4.24, 4.12, 562, 563, 564, 4.14, 220/4.21
See application file for complete search history.

(56) References Cited

U.S. PATENT DOCUMENTS

| | | | | |
|---|---|---|---|---|
| 3,653,531 A | * | 4/1972 | Zurmuehlen | 220/4.14 |
| 3,931,907 A | * | 1/1976 | Henle | 220/530 |
| 4,357,027 A | * | 11/1982 | Zeitlow | 280/834 |
| 4,453,564 A | * | 6/1984 | Bergesio | 137/574 |
| 4,518,091 A | | 5/1985 | Scheurenbrand et al. | |
| 4,526,286 A | | 7/1985 | Jüng et al. | |
| 4,611,724 A | | 9/1986 | Watkins et al. | |
| 4,886,180 A | | 12/1989 | Bonczyk | |
| 5,020,687 A | | 6/1991 | Seizert | |
| 5,848,720 A | * | 12/1998 | Logan | 220/563 |
| 6,138,859 A | | 10/2000 | Aulph et al. | |
| 6,568,556 B1 | | 5/2003 | Kahler, Jr. et al. | |
| 6,691,889 B1 | | 2/2004 | Falk | |
| 6,875,258 B2 | * | 4/2005 | Kuperus | 96/147 |
| 6,982,105 B2 | | 1/2006 | Huse | |
| 7,984,925 B2 | * | 7/2011 | Levin et al. | 280/833 |
| 2002/0066737 A1 | | 6/2002 | Stack et al. | |

* cited by examiner

*Primary Examiner* — Steven A. Reynolds
(74) *Attorney, Agent, or Firm* — Wells St. John P.S.

(57) ABSTRACT

A fuel tank assembly for vehicles including a fuel tank shell having reduced wall thickness, accordingly resulting in a reduced total mass of the tank assembly. The fuel tank shell comprises two half shells connected to one another and having at least one support member attached thereto for providing structural support to the fuel tank shell. In particular, the support member may be positioned internally or externally to the fuel tank with such a positioning being selected so as to offer support in at least one area where the stress level exerted on the fuel tank shell is maximum.

20 Claims, 6 Drawing Sheets

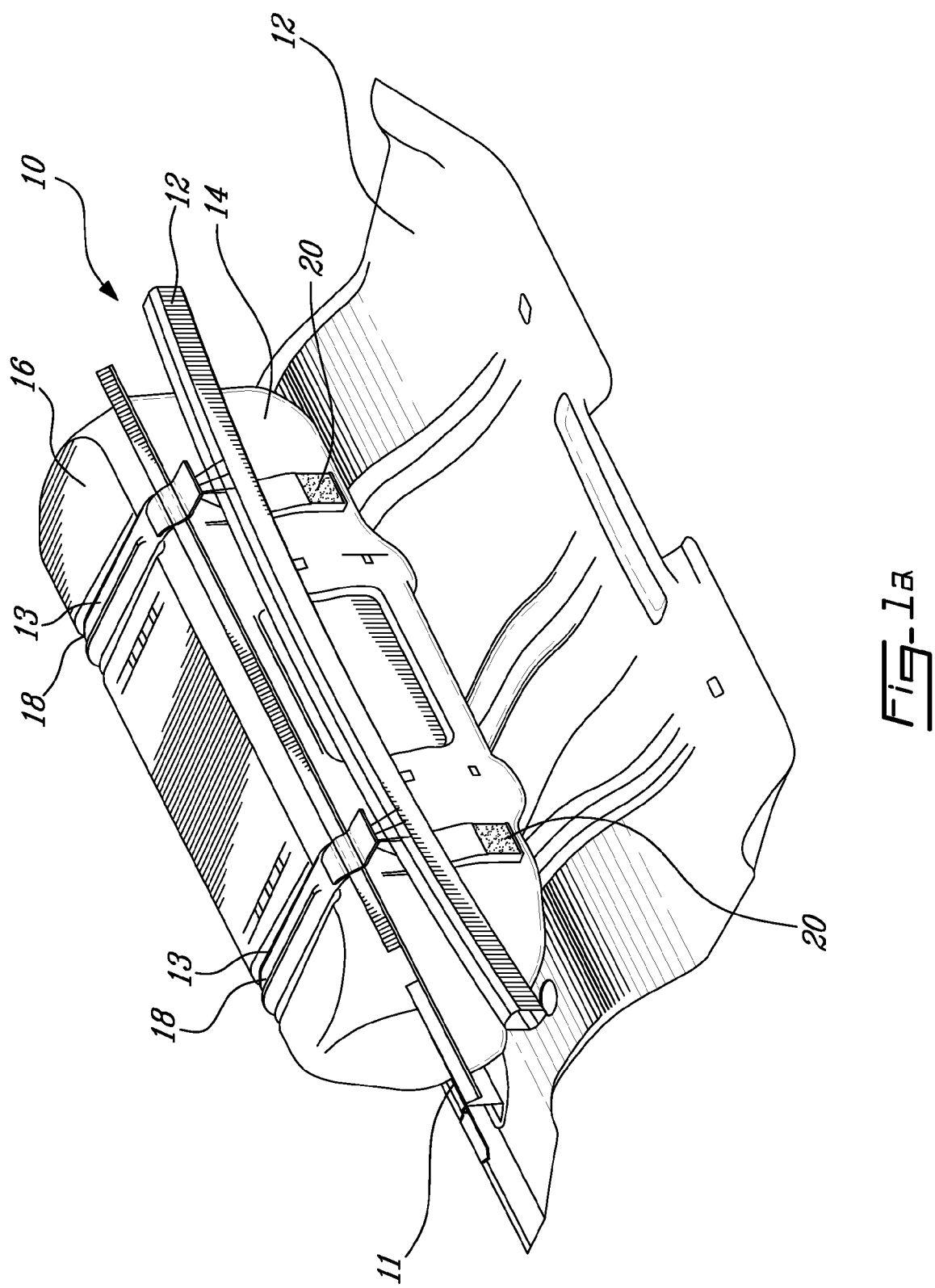

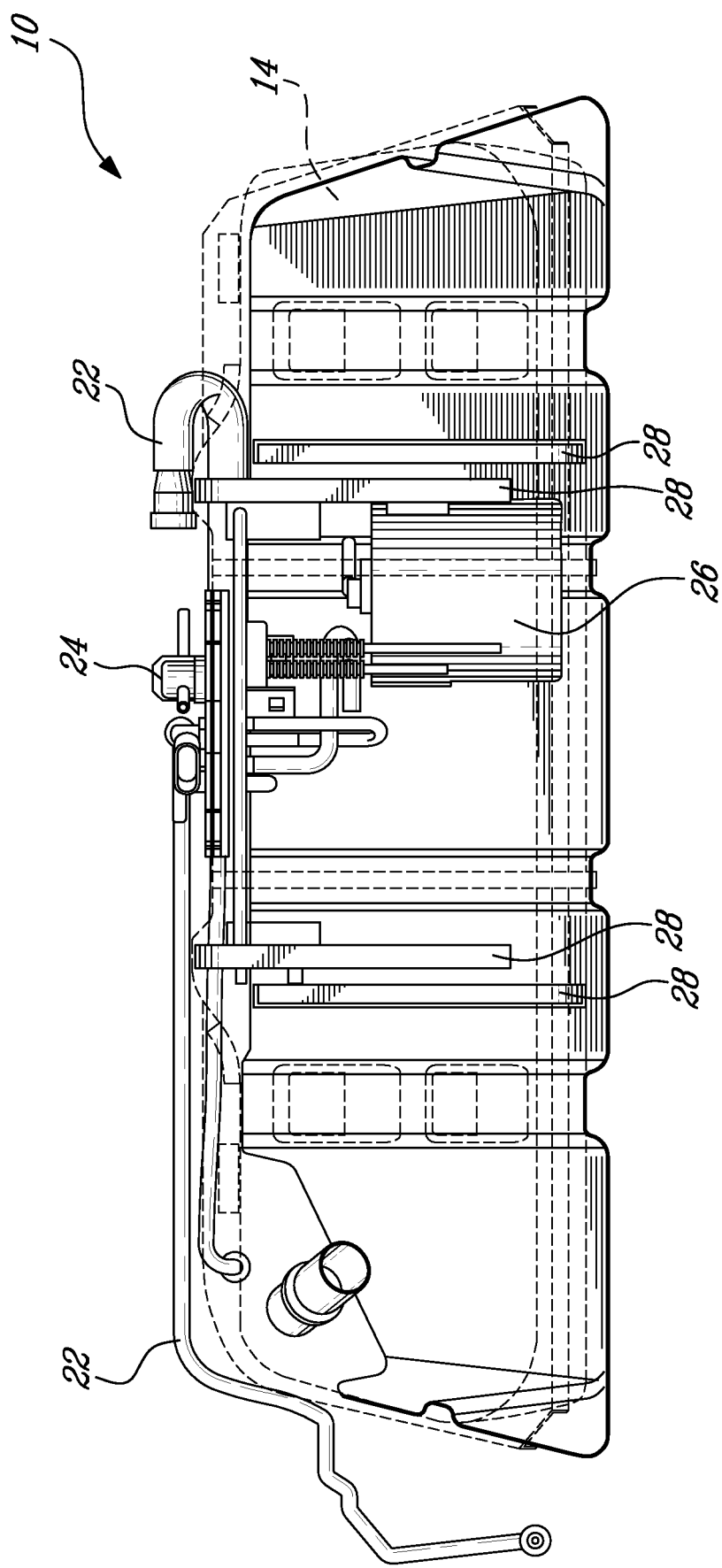

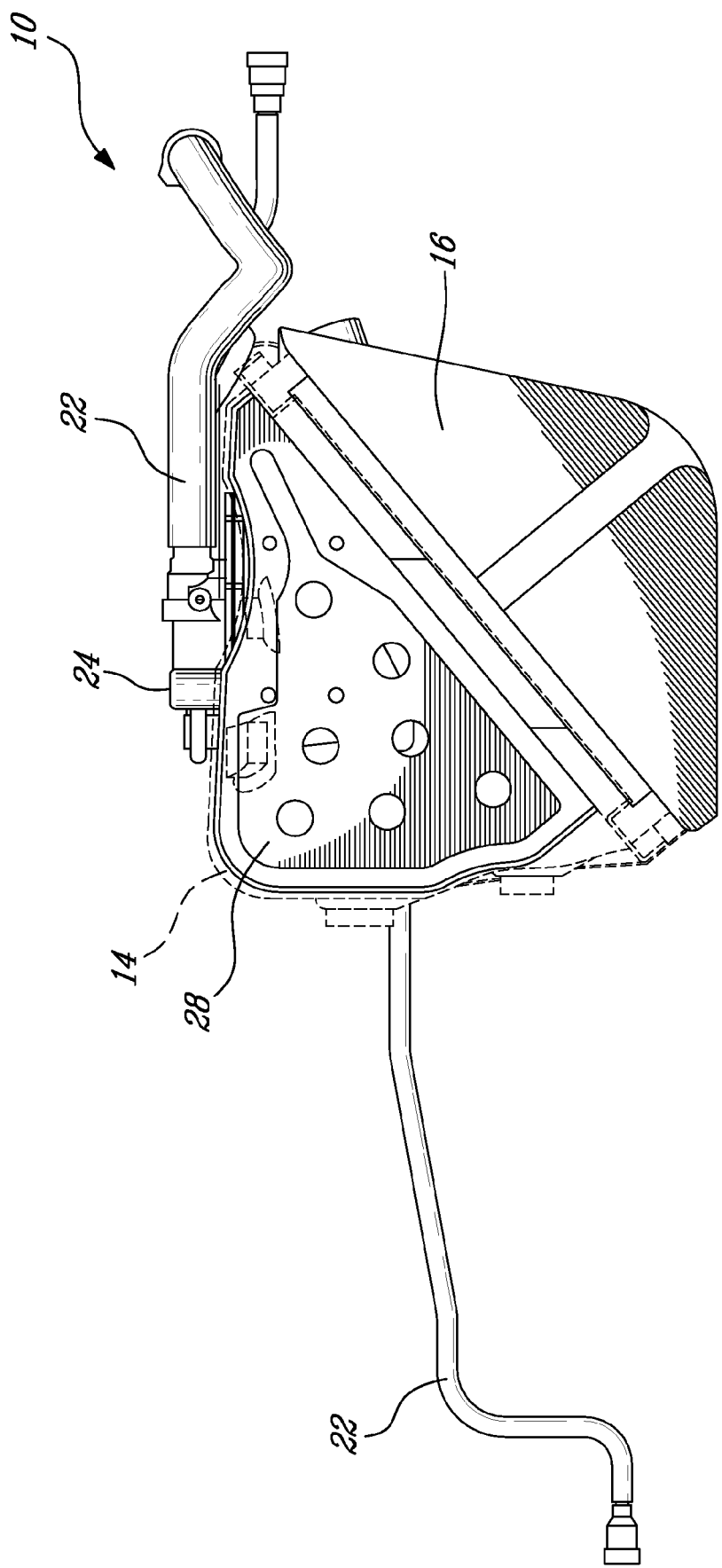

FUEL TANK SHELL WITH STRUCTURAL SUPPORT

CROSS REFERENCE TO RELATED APPLICATIONS

This application claims priority on U.S. Provisional Application No. 61/024,239, filed on Jan. 29, 2008 and which is herein incorporated by reference in its entirety.

FIELD OF THE INVENTION

The present invention relates to a fuel tank assembly. More specifically, the present invention is concerned with a fuel tank assembly for vehicles.

BACKGROUND OF THE INVENTION

With recent environmental legislation, vehicle fuel economy has become a great concern. An effective way of reducing fuel consumption is to decrease the mass of vehicular components.

The fuel tank is a component which must meet a certain vehicle durability requirement. To reduce fuel tank mass, its thickness can be diminished but not to the expense of its ability to meet the durability requirement. Therefore, there is a need to find a way of decreasing the mass of the fuel tank assembly while maintaining the rigidity of its structure.

Currently, the stresses in a fuel tank are managed through the choice of material, wall thickness and geometric shape and section properties of the tank shell. The geometry and section properties are constrained by the forming limitations of the material, the available package space in the vehicle environment and the desired fuel tank volume capacity. The wall thickness is generally established for the worst case local stress condition within the geometry of the shell. The shell thickness required for the localized worst case stress is applied approximately uniformly over the entire surface of the tank shell. Much of the tank carries a heavier wall thickness than required to meet the localized stress therefore increasing the total mass of the tank above the optimum level.

In order to overcome these and other drawbacks, the prior art teaches the use of supports, reinforcements, or the like, which provide additional structural rigidity to the tank assembly. However, there is no teaching of positioning such supports in localized areas of the tank shell, which are subjected to heavier levels of pressure and deflection. Instead, the prior art typically teaches providing reinforcements that span along the entire surface of the tank shell's walls. Still, when localized reinforcement is taught, such elements do not however enable a reduction in the thickness of the entire tank shell, and accordingly a reduction in the total mass of the tank.

What is therefore needed, and an object of the present invention, is an improved fuel tank assembly comprising support members, which provide support to areas of the tank shell that exhibit high levels of stress while also achieving a reduction in the thickness of the fuel tank shell.

SUMMARY OF THE INVENTION

More specifically, in accordance with the present invention, there is provided a fuel tank assembly for attachment to a vehicle body. The fuel tank assembly comprises a fuel tank shell for containing fuel and a support member mounted to the tank shell along a direction substantially normal to a longitudinal axis thereof. The support member is positioned in an area of the tank shell where a level of stress exerted on the tank shell is maximum, thereby providing structural support to the tank shell and enabling a reduction of the thickness of the tank shell to a minimum value meeting a fuel tank durability requirement.

The support member may be located inside or outside the tank shell, in an area where deflection and corresponding stress is high. The support member limits tank shell deflection, thereby decreasing the corresponding stress level. The decrease in stress level allows for a decrease in tank shell material thickness and consequently to a reduction in the mass of the vehicle fuel tank assembly.

The material of the support member may either be metallic or non-metallic depending on the degree of structural support required.

The support member may be attached to the tank shell either by a secondary component, by welding, by an adhesive bond or by a mechanical retention method.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 1a is a right bottom perspective view of a fuel tank shell assembly mounted on a vehicle body in accordance with an illustrative embodiment of the present invention;

FIG. 2b is a transparent front view of a fuel tank shell assembly in accordance with an illustrative embodiment of the present invention;

FIG. 2c is a transparent side view of a fuel tank shell assembly in accordance with an illustrative embodiment of the present invention.

DESCRIPTION OF ILLUSTRATIVE EMBODIMENTS

The present invention is illustrated in further details by the following non-limiting examples.

Figure 1B:
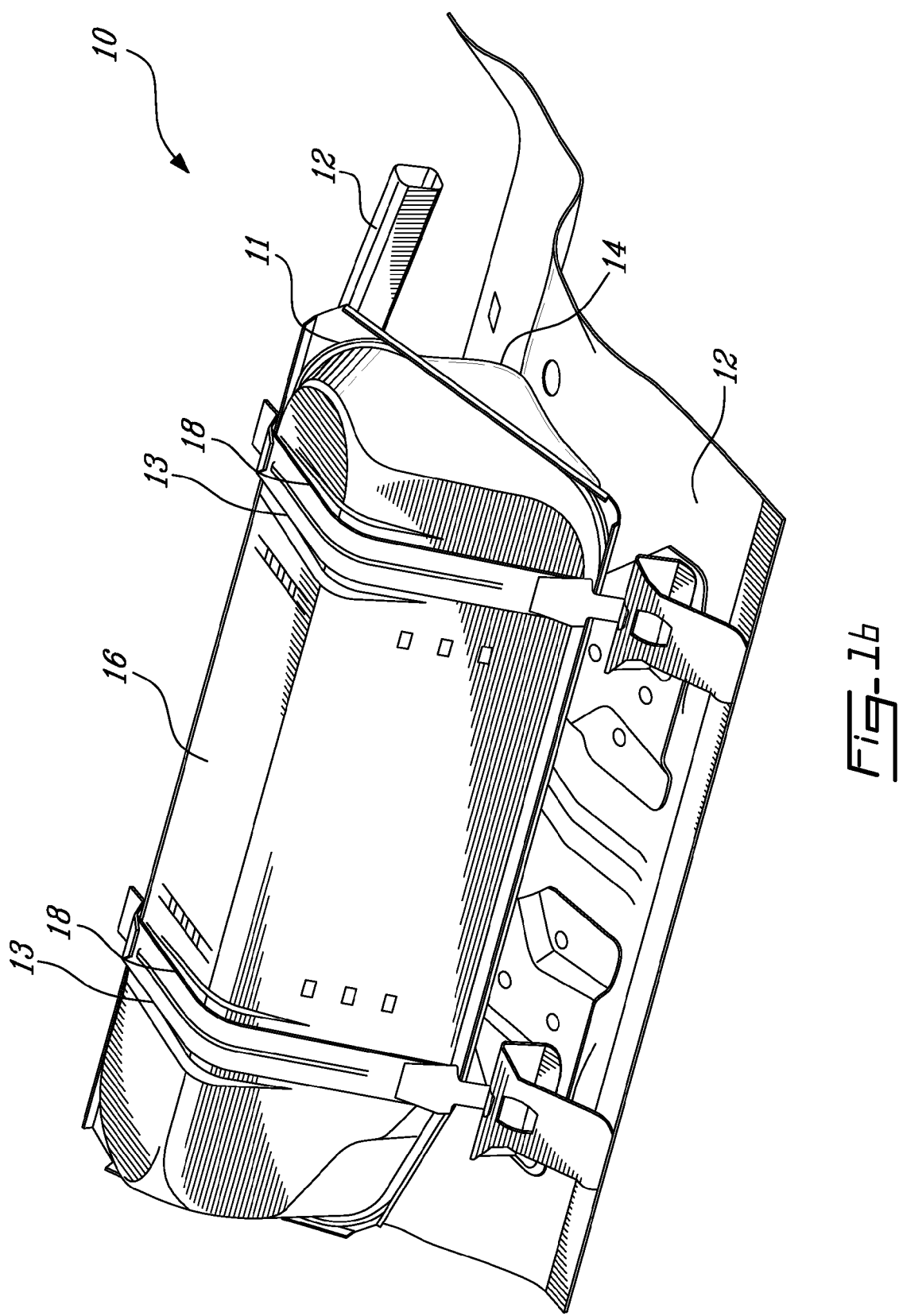
FIG. 1b is a is a left bottom perspective view of a fuel tank shell assembly mounted on a vehicle body in accordance with an illustrative embodiment of the present invention.

Referring to FIGS. 1a and 1b, and in accordance with an illustrative embodiment of the present invention, a fuel tank assembly generally referred to using the reference numeral 10, will now be described. The fuel tank assembly 10 is illustratively mounted to a vehicle body 12 (shown in an upside-down configuration). The tank assembly 10 comprises a shell, which may be formed of two halves, illustratively a top half shell 14 and a bottom half shell 16 having a substantially triangular cross-section, which may comprise a flanged border 11 providing a contact area for connecting the shells 14, 16 to one another. Alternatively, the shells 14, 16, which may be made of a metallic material (e.g. steel), may be flangeless and persons skilled in the art will thus understand that various methods of manufacturing an equivalent tank assembly according to the present invention may be used to achieve the same results. For example, the fuel tank assembly may be manufactured by blow molding or by twin sheet plastic construction.

Still referring to FIGS. 1a and 1b, depressions 13 are illustratively formed into the bottom half shell 16 to retain straps 18 which are installed in the depressions 13 to secure the tank assembly 10 to the vehicle body 12. In addition to the straps 18, a plurality of pads as in 20 manufactured of isolating material, such as foam or plastic, are illustratively mounted to the top half shell 14 to block potential translational movement of the tank assembly 10 relative to the vehicle body 12 when the vehicle (not shown) is in movement.

Figure 2A:
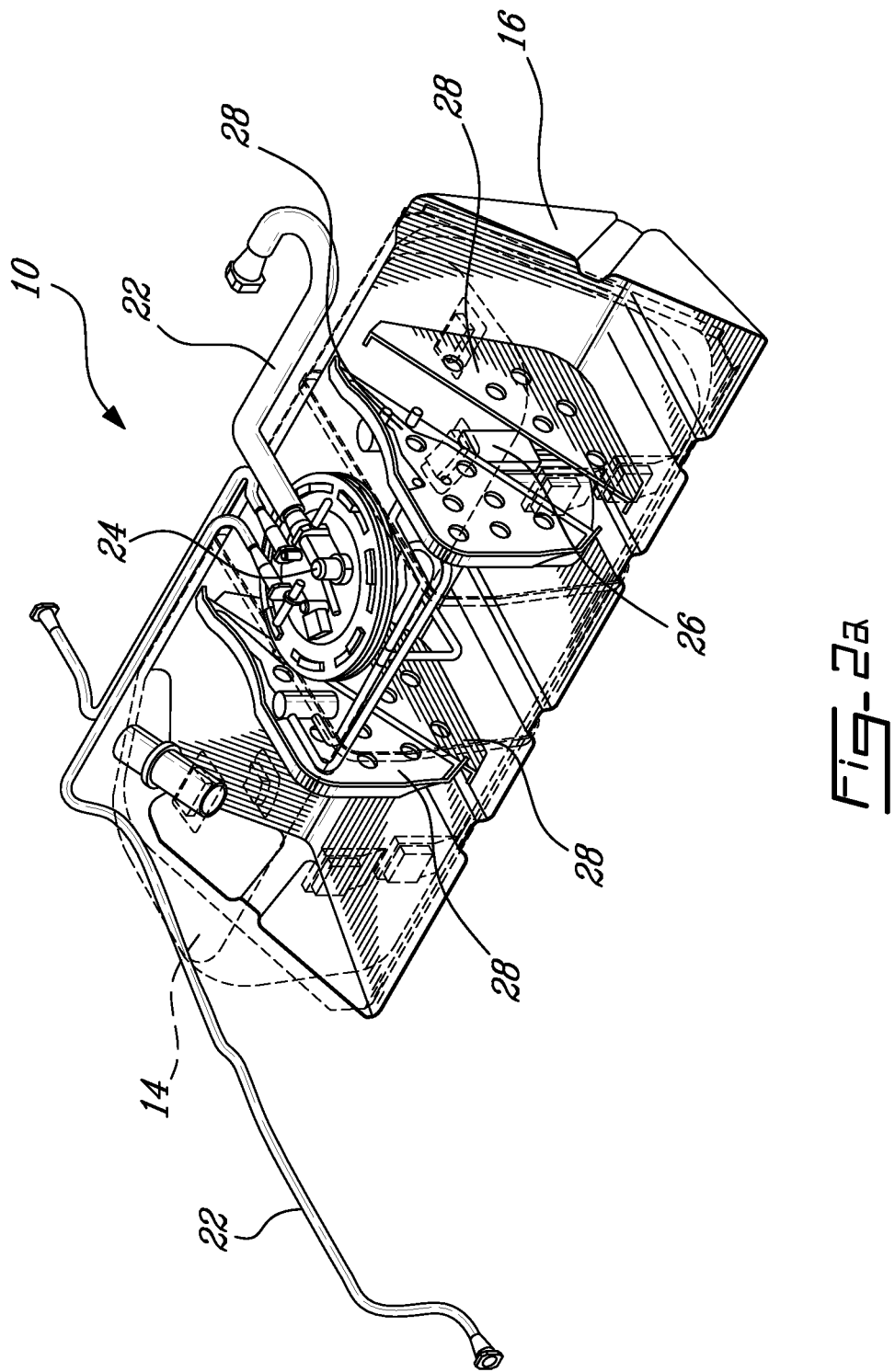
FIG. 2a is a transparent right front perspective view of a fuel tank shell assembly in accordance with an illustrative embodiment of the present invention.

Referring now to FIGS. 2a, 2b and 2c, the tank assembly 10 illustratively includes a plurality of lines as in 22 and a valve 24 for filling the tank 10 with fuel (not shown), venting the tank 10 and feeding the vehicle engine (not shown) in a conventional manner. A fuel pump 26 further creates the pressure necessary for the fuel to be carried to the engine. A plurality of support members as in 28 are also installed within the tank assembly 10 for providing structural support to the fuel tank 10, as will be discussed further herein below. The supports as in 28 may be made of either a metallic or non-metallic material according to the degree of structural support required by the overall assembly 10. The specific positioning of the supports 28 relative to the shells is further selected so as to offer structural support in areas of the fuel tank 10 where the stress level exerted on the latter is maximum. As such, it may for example be desirable to position the supports members as in 28 in a single location within the tank 10 or alternatively in two (2) different locations, as illustrated in FIG. 2a. The support members as in 28 may also be installed in more locations, as desired. In this manner, the support offered by the supports 28 decreases the overall stress level exerted on the shells 14 and 16, which can therefore be made thinner, thereby reducing the total mass of the tank assembly 10. Although it is possible to mount two (2) supports as in 28 to the tank shells 14, 16, it is desirable to use four (4) supports as in 28 as use of the latter exhibited better results. Indeed, the number of support members as in 28 to be used will depend on the design requirements, and in particular on the size of the fuel tank 10 and on the minimum thickness (e.g. 0.7 mm) required for durability of the fuel tank 10. Another significant requirement includes the level of pressure and other stresses exerted on the fuel tank 10 when the vehicle is in operation. Two (2) support members as in 28 may thus for example be positioned in two (2) different locations of the tank 10, either in pairs (as illustrated) or not. Alternatively, three (3) supports members as in 28 may be installed in different locations within the fuel tank 10.

Figure 3:
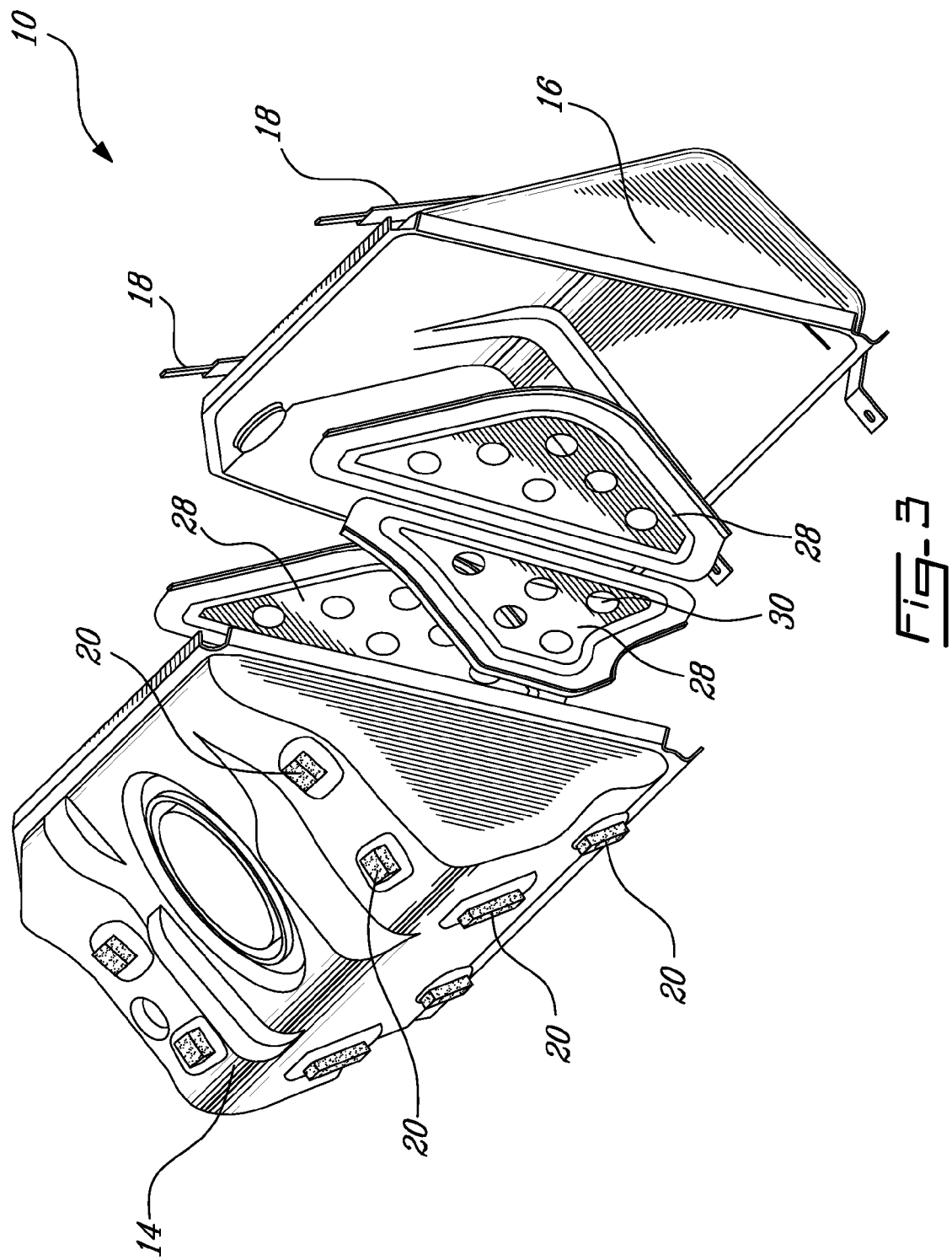
FIG. 3 is an exploded view showing the positioning of the support members inside the two half shells of a fuel tank assembly in accordance with an illustrative embodiment of the present invention.

Referring now to FIG. 3, according to a first illustrative embodiment of the present invention, four (4) supports 28 may be installed inside the tank top and bottom shells 14, 16. In this embodiment, the supports 28 are illustratively designed so as to be triangular shaped planar surfaces mounted in adjacent pairs along a direction substantially normal to the longitudinal axis (not shown) of the fuel tank 10, i.e. in a substantially vertical orientation. As can be seen from FIG. 3, a first one from a pair of supports as in 28 is mounted to the top shell 14 while a second one from a pair of supports as in 28 is mounted to the bottom shell 16 adjacent and substantially parallel to the first support 28. In particular, the two sides forming the greater angle of a support 28 are attached to a corresponding shell 14 or 16, e.g. by welding, adhesive bond or a mechanical retention method. Thus, when the shells 14 and 16 are bonded at the flange (reference 11 in FIG. 1a) during assembly, facing supports as in 28 of a pair do not make contact. Supports as in 28 of the second pair are mounted to the shells 14, 16 in a similar manner so as to be spaced apart from supports as in 28 of the first pair, with the spacing (not shown) being selected according to design requirement. In the present embodiment, the two (2) pairs of supports as in 28 are spaced by a distance sufficient to accommodate the valve (reference 24 in FIG. 2a). In this manner, once assembly is completed, two (2) supports as in 28 are illustratively attached to the top shell 14 while the remaining two (2) supports as in 28 are attached to the bottom shell 16, with all supports as in 28 being substantially parallel to one another. Increased structural support can therefore be advantageously achieved using such a configuration of the supports as in 28. Also, although the supports as in 28 are illustrated as triangular planar surfaces to better match the shape of the shells 14, 16, it will be apparent that other shapes may be contemplated.

Still referring to FIG. 3, each support 28 illustratively comprises on the surface thereof a plurality of apertures or holes as in 30, thereby only partially obstructing the fuel displacement inside the tank 10 and advantageously reducing shocks caused by successive displacements of large amounts of fuel, or sloshing, when the vehicle is in operation. The holes 30, which are preferably of a generally round or oval shape (although other shapes are also possible), may be of uniform or varying size depending on design requirements.

Referring back to FIG. 2a, for experimental purposes, four (4) Tin-Zinc (Sn—Zn) supports as in 28 having a thickness of about 1.4 mm were mounted in pairs to the top and bottom shells 14, 16 at two (2) different locations to provide the desired structural support to the fuel tank 10. As a result, the Applicants were advantageously able to reduce the thickness of the tank shells 14, 16 from 1.8 mm to 1.1 mm, within an acceptable maximum deflection parameter of less than 7 mm. This resulted in a lighter fuel tank 10 exhibiting a reduction in mass of about 3.72 kg while maintaining the rigidity of its structure. In particular, the maximum deflection that could be withstood by the fuel tank 10 of the present invention increased from about 1.99 mm to about 5.5 mm. The stress level that could be withstood by the fuel tank 10, as measured from the peak von Mises value, also increased from a pressure of about 152 MPa to about 225 MPa at 3.5 PSI and from about 90 MPa to about 143 MPa at −2.0 PSI. As mentioned herein above, experiments also showed that better results were obtained when using four (4) supports as in 28 instead of two (2).

Structural support and gage reduction of the shells 14, 16 are thus the primary benefits of the supports 28. When the supports 28 are positioned internal to the shells 14, 16, these may also be advantageously used a fuel slosh baffles. In addition, although the supports 28 have been illustrated as being mounted inside the tank 10, it is possible with some minor design changes for the supports 28 to be mounted externally on the tank 10 in order to also achieve the benefits of structural support and gage reduction.

Although the present invention has been described hereinabove by way of specific embodiments thereof, it can be modified, without departing from the spirit and nature of the subject invention as defined in the appended claims.

The invention claimed is:

1. A fuel tank assembly for attachment to a vehicle body, the fuel tank assembly comprising:
   a fuel tank shell for containing fuel, said fuel tank shell having a thickness set to a minimum value that withstands a level of maximum stress when the vehicle is in operation; and
   a support member only mounted to said tank shell along a direction substantially normal to a longitudinal axis thereof and only positioned in an area of said tank shell where a level of stress exerted on said tank shell is maximum, thereby providing structural support to said tank shell and enabling a reduction of a mass of the tank assembly.

2. The fuel tank assembly of claim 1, wherein said tank shell comprises a first half shell mated with a second half shell.

3. The fuel tank assembly of claim 2, wherein said first and second half shells are mated at a first and a second flanged border respectively formed thereon.

4. The fuel tank assembly of claim 2 comprising a first and a second one of said support member, wherein said first half shell and said second half shell each have a substantially triangular cross-section and further wherein each one of said first and second support member is triangular-shaped.

5. The fuel tank assembly of claim 2 comprising a first and a second one of said support member, wherein said first support member is mounted to said first half shell and said second support member is mounted to said second half shell such that when said first and second half shells are mated said first support member faces said second support member without making contact therewith.

6. The fuel tank assembly of claim 1, wherein said minimum value is 0.7 mm.

7. The fuel tank assembly of claim 1, further comprising at least one depression formed in said tank shell for receiving therein at least one strap for attaching the fuel tank assembly to the vehicle body.

8. The fuel tank assembly of claim 1, further comprising at least one pad mounted on said tank shell for limiting a translational movement of said tank shell relative to the vehicle body.

9. The fuel tank assembly of claim 1, wherein said support member is mounted inside said tank shell.

10. The fuel tank assembly of claim 9, wherein said support member comprises a perforated surface, thereby only partially obstructing a displacement of said fuel inside said tank shell.

11. The fuel tank assembly of claim 1, wherein said support member is made of metallic material.

12. The fuel tank assembly of claim 11, wherein said metallic material is Tin-Zinc.

13. The fuel tank assembly of claim 1, wherein said support member is made of non-metallic material.

14. The fuel tank assembly of claim 1, wherein said support member comprises on an edge thereof a flange and is mounted to said tank shell via said flange.

15. The fuel tank assembly of claim 1, wherein said support member is mounted to said tank shell using a fastening technique selected from the group consisting of welding, adhesive bonding, and mechanical retention.

16. The fuel tank assembly of claim 1, wherein a plurality of said support member is mounted to said tank shell, said plurality of said support member being spaced from one another along said longitudinal axis.

17. The fuel tank assembly of claim 1, wherein a plurality of said support member is mounted in pairs to said tank shell, said support member pairs being spaced from one another along said longitudinal axis.

18. The fuel tank assembly of claim 1 wherein the support member extends linearly from one interior surface of the tank shell to the another interior surface of the tank shell.

19. The fuel tank assembly of claim 1 wherein the support member is planar.

20. A method of assembling a fuel tank assembly for attachment to a vehicle body, the method comprising:
- providing a tank shell having a thickness set to a minimum value and withstanding a level of maximum stress when the vehicle is in operation;
- selecting an area of the tank shell where a level of stress exerted on the tank shell is maximum, when the vehicle is in operation;
- mounting a support member on said tank shell only along a direction substantially normal to a longitudinal axis of said fuel tank shell; and
- positioning said support member only in said area of said tank shell where said level of stress exerted on said tank shell is maximum, thereby providing structural support to said tank shell and enabling a reduction of a total mass of the tank assembly.

* * * * *